(12) United States Patent
Ramamurthy et al.

(10) Patent No.: US 10,747,289 B2
(45) Date of Patent: Aug. 18, 2020

(54) DATA CENTER POWER MANIPULATION

(71) Applicant: Virtual Power Systems, Inc., Santa Clara, CA (US)

(72) Inventors: Shankar Ramamurthy, Saratoga, CA (US); Akshay Krishnamoorthy, Santa Clara, CA (US); Martin P Leslie, San Jose, CA (US); Wade Floren Schott, Santa Clara, CA (US); Karimulla Raja Shaikh, Cupertino, CA (US)

(73) Assignee: Virtual Power Systems, Inc., Milpitas, CA (US)

( * ) Notice: Subject to any disclaimer, the term of this patent is extended or adjusted under 35 U.S.C. 154(b) by 52 days.

(21) Appl. No.: 15/381,049

(22) Filed: Dec. 15, 2016

(65) Prior Publication Data

US 2017/0097667 A1 Apr. 6, 2017

Related U.S. Application Data

(63) Continuation-in-part of application No. 14/526,140, filed on Oct. 28, 2014, now Pat. No. 10,128,684.

(Continued)

(51) Int. Cl.
*G06F 1/32* (2019.01)
*G06F 1/26* (2006.01)
(Continued)

(52) U.S. Cl.
CPC ............ *G06F 1/3203* (2013.01); *G06F 1/28* (2013.01); *H02J 7/0063* (2013.01); *H02J 9/061* (2013.01);
(Continued)

(58) Field of Classification Search
CPC .................................. G06F 1/26; G06F 1/32
See application file for complete search history.

(56) References Cited

U.S. PATENT DOCUMENTS 6,396,170 B1 5/2002 Laufenberg et al.
6,967,283 B2 11/2005 Rasmussen et al.
(Continued)

FOREIGN PATENT DOCUMENTS

EP 2372861 B1 10/2011
JP 2009232521 A 10/2009
(Continued)

OTHER PUBLICATIONS

Metcalf, Jeffrey, "Power Efficiency Comparison: Cisco UCS® 5108 Blade Server Chassis and HP BladeSystem® c7000 Enclosure", Copyright Sep. 2013, Cisco.
(Continued)

*Primary Examiner* — Phil K Nguyen
(74) *Attorney, Agent, or Firm* — Adams Intellex, PLC

(57) ABSTRACT

Disclosed techniques enable power manipulation within a data center based on power policies. Power policies are used to establish behavior based on limits for power consumption, power generation, and other criteria. Rules are established to provide fractional power sharing and control under certain conditions. Power caches are used to supplement power sources under conditions of peak power requirements. When power requirements are below a threshold set forth in a power policy, the power caches are replenished.

29 Claims, 11 Drawing Sheets

Related U.S. Application Data

(60) Provisional application No. 62/267,961, filed on Dec. 16, 2015, provisional application No. 61/896,504, filed on Oct. 28, 2013, provisional application No. 61/931,667, filed on Jan. 26, 2014, provisional application No. 61/970,390, filed on Mar. 26, 2014, provisional application No. 61/985,617, filed on Apr. 29, 2014, provisional application No. 62/029,226, filed on Jul. 25, 2014, provisional application No. 62/033,618, filed on Aug. 5, 2014, provisional application No. 62/047,593, filed on Sep. 8, 2014, provisional application No. 62/057,127, filed on Sep. 29, 2014.

(51) Int. Cl.
G06F 1/3203 (2019.01)
G06F 1/28 (2006.01)
H02J 7/00 (2006.01)
H02J 9/06 (2006.01)

(52) U.S. Cl.
CPC ....... *H02J 9/062* (2013.01); *H02J 2007/0067* (2013.01); *Y10T 307/344* (2015.04)

(56) References Cited

U.S. PATENT DOCUMENTS

| | | | |
|---|---|---|---|
| 7,236,896 B2 | 6/2007 | Farkas et al. | |
| 7,750,501 B2* | 7/2010 | Huang | H02M 1/32 307/25 |
| 8,051,316 B2* | 11/2011 | Roberts | G06F 1/3203 713/300 |
| 8,193,662 B1 | 6/2012 | Carlson et al. | |
| 8,261,102 B2* | 9/2012 | Cheng | G06F 1/263 307/18 |
| 8,464,080 B2 | 6/2013 | Archibald et al. | |
| 8,527,619 B2 | 9/2013 | Ewing et al. | |
| 8,595,379 B1 | 11/2013 | Brandwine | |
| 8,958,923 B2 | 2/2015 | Kake et al. | |
| 9,641,025 B2 | 5/2017 | Agrawal et al. | |
| 9,865,998 B1 | 1/2018 | Emert et al. | |
| 2003/0056125 A1 | 3/2003 | O'Conner et al. | |
| 2003/0079150 A1* | 4/2003 | Smith | G06F 1/3203 713/320 |
| 2003/0222618 A1* | 12/2003 | Kanouda | G06F 1/30 320/116 |
| 2005/0055587 A1* | 3/2005 | Lee | G06F 1/28 713/300 |
| 2005/0071092 A1 | 3/2005 | Farkas et al. | |
| 2005/0086543 A1* | 4/2005 | Manuell | G06F 11/3006 713/300 |
| 2005/0156571 A1* | 7/2005 | Inui | H02J 7/0075 320/132 |
| 2005/0162019 A1 | 7/2005 | Masciarelli et al. | |
| 2006/0082222 A1* | 4/2006 | Pincu | H02J 1/102 307/29 |
| 2006/0168464 A1* | 7/2006 | Yuasa | G06F 1/3203 713/340 |
| 2006/0212636 A1* | 9/2006 | Yasuo | G06F 1/263 710/303 |
| 2007/0097569 A1* | 5/2007 | Huang | H02M 1/32 361/56 |
| 2007/0216229 A1 | 9/2007 | Johnson, Jr. et al. | |
| 2008/0010521 A1* | 1/2008 | Goodrum | G06F 1/3203 714/22 |
| 2008/0067872 A1 | 3/2008 | Moth | |
| 2008/0320322 A1 | 12/2008 | Green et al. | |
| 2009/0144568 A1 | 6/2009 | Fung | |
| 2010/0037070 A1 | 2/2010 | Brumley et al. | |
| 2010/0052426 A1* | 3/2010 | Carter | G06F 1/26 307/64 |
| 2010/0058092 A1 | 3/2010 | Bougaev et al. | |
| 2010/0077238 A1 | 3/2010 | Vogman et al. | |
| 2010/0205469 A1 | 8/2010 | McCarthy et al. | |
| 2010/0211810 A1 | 8/2010 | Nacho | |
| 2010/0235003 A1* | 9/2010 | Maly | G06F 1/206 700/276 |
| 2010/0264741 A1 | 10/2010 | Togare | |
| 2010/0328849 A1 | 12/2010 | Ewing et al. | |
| 2010/0332857 A1* | 12/2010 | Vogman | G06F 1/263 713/300 |
| 2011/0133559 A1 | 6/2011 | Yamashita et al. | |
| 2011/0245988 A1 | 10/2011 | Ingels et al. | |
| 2011/0252247 A1* | 10/2011 | Yokoyama | H02J 7/34 713/300 |
| 2011/0264937 A1 | 10/2011 | Meisner et al. | |
| 2011/0302432 A1 | 12/2011 | Harris et al. | |
| 2011/0304211 A1* | 12/2011 | Peterson | G06F 1/263 307/48 |
| 2012/0054512 A1 | 3/2012 | Archibald et al. | |
| 2012/0066519 A1 | 3/2012 | El-Essawy et al. | |
| 2012/0098343 A1* | 4/2012 | Harris | G06F 1/183 307/48 |
| 2012/0303993 A1* | 11/2012 | Nishtala | G06F 1/28 713/340 |
| 2014/0009117 A1* | 1/2014 | Ishii | H02J 7/34 320/126 |
| 2014/0214222 A1* | 7/2014 | Rouse | G06Q 50/06 700/291 |
| 2014/0229128 A1* | 8/2014 | Komano | G01R 21/133 702/61 |
| 2015/0057821 A1 | 2/2015 | Nasle | |
| 2015/0087278 A1* | 3/2015 | Kim | H04L 12/2818 455/414.1 |
| 2015/0378408 A1 | 12/2015 | Kaplan | |
| 2015/0380968 A1 | 12/2015 | Lee | |
| 2016/0020609 A1 | 1/2016 | Carrasco et al. | |
| 2016/0209901 A1 | 7/2016 | Wilcox et al. | |
| 2016/0320825 A1 | 11/2016 | Panda et al. | |
| 2017/0025876 A1 | 1/2017 | Chan | |
| 2017/0201425 A1 | 7/2017 | Marinelli et al. | |
| 2017/0322241 A1 | 11/2017 | Tang et al. | |
| 2019/0122132 A1 | 4/2019 | Rimini et al. | |

FOREIGN PATENT DOCUMENTS

| | | |
|---|---|---|
| WO | WO2011119444 A2 | 9/2011 |
| WO | WO2012091323 A2 | 7/2012 |

OTHER PUBLICATIONS

"VMware® Distributed Power Management Concepts and Use", White Paper, Copyright 2010 VMware, Inc., 3401 Hillview Avenue Palo Alto CA 94304 USA.

Mammano, Bob, "Load Sharing with Paralleled Power Supplies", Copyright 2001, Texas Instruments Incorporated, Dallas, Texas.

Muccini, Mark, el al., "Power Consumption Reduction: Hot Spare", A Dell technical white paper, Feb. 2012, Rev. 1.0, Dell, Inc.

Meisner, David, Brian T. Gold, and Thomas F. Wenisch. "PowerNap: eliminating server idle power." ACM SIGARCH Computer Architecture News 37.1 (2009): 205-216.

International Search Report dated Feb. 9, 2015 for PCT/US2014/062650.

International Search Report dated Jan. 30, 2015 for PCT/US2014/062684.

* cited by examiner

```
// Example of policy sent to a device
{
    "utilityLimit" : 3840,              // Maximum utility draw in Watts
    "peakShaveLimit" : 2000,            // Maximum power draw from power cache in Watts
    "peakShaveSoc" : 20                 // State of Charge below which peak shaving is disabled (in percent)
    "peakShaveEnableDisable" : true     // Indicate whether device should peak shave or not
}

// Example of policy sent at Group Level
{
    "groupTargetUtilityLimit" : 234000,     // Target utility power draw in Watts to be maintained by the group
                                            // of device
    "groupMaximumUtilityLimit" : 282444,    // Avoid going over this limit in Watts unless the power cache levels
                                            // are critically low
}

// Example of Dynamic Redundancy policy sent to a Switch
{
    "policy" : [
        // Each policy entry below indicates what to do with switches in the device based on feed state
        { "feedA" : true,  "feedB" : true,  "switchA": "On",  "switchB" : "Off" },
        { "feedA" : true,  "feedB" : false, "switchA": "On",  "switchB" : "Off" },
        { "feedA" : false, "feedB" : true,  "switchA": "Off", "switchB" : "On"  },
        { "feedA" : false, "feedB" : false, "switchA": "Off", "switchB" : "Off" }
    ]
}
```

FIG. 10

DATA CENTER POWER MANIPULATION

RELATED APPLICATIONS

This application claims the benefit of U.S. provisional patent application "Energy Control by Peak Shaving and Source Pooling" Ser. No. 62/267,961, filed Dec. 16, 2016. This application is also a continuation-in-part of U.S. patent application "Energy Control Via Power Requirement Analysis and Power Source Enablement" Ser. No. 14/526,140, filed Oct. 28, 2014, which claims the benefit of U.S. provisional patent applications "Intelligent Control of Energy and Power Management" Ser. No. 61/896,504, filed Oct. 28, 2013, "Intelligent Power Control" Ser. No. 61/931,667, filed Jan. 26, 2014, "Dynamic Power Control Through Resource Allocation" Ser. No. 61/970,390, filed Mar. 26, 2014, "Dynamic Power Capacity Allocation" Ser. No. 61/985,617, filed Apr. 29, 2014, "Multi-Level Data Center Consolidated Power Control" Ser. No. 62/029,226, filed Jul. 25, 2014, "Multi-Level Dynamic Power Control Through Capacity Allocation" Ser. No. 62/033,618, filed Aug. 5, 2014, "Energy Control Via Power Requirement Analysis and Power Source Enablement" Ser. No. 62/047,593, filed Sep. 8, 2014, and "Intelligent Control Of Energy For Rack Level Consolidated Power Systems" Ser. No. 62/057,127, filed Sep. 29, 2014. The foregoing applications are each hereby incorporated by reference in their entirety.

FIELD OF ART

This application relates generally to power control and more particularly to data center power manipulation.

BACKGROUND

Data centers that house large amounts of computing equipment are critical for modern business and commerce systems. Applications such as banking, e-commerce, cloud computing, cloud storage, video sharing, and social media all rely on data centers to implement the functionality. The reliability of such data centers is a function of the reliability of the electric power sources for these data centers.

For enterprise level applications, electricity costs can be a considerable portion of the operating budget. Furthermore, there can be many devices such as servers, storage devices, routers, and other communications and monitoring equipment placed together in racks in an information technology (IT) application. Data centers can house many rows of racks, and thus the power consumption of the data centers is often very high. Additionally, the power demand for both industrial applications and data centers can fluctuate based on various business factors, such as the time of day or season. Thus, managing power becomes an important aspect in many industrial applications, including data center administration. Even further, any energy savings achieved can translate into increased profits for an organization. Additionally, energy savings can provide additional dividends in terms of reduced wear and tear on power sources and reduced cooling costs, adding to the received benefit of an organization.

With data centers, also known as "server farms," there can be hundreds or even thousands of racks. The devices on the racks typically provide functionality, including the storage, processing, and retrieval of data. Given the power requirements demanded by the rack-mounted devices, reliable and efficient power delivery is crucial for successful operation of the organizations using the data centers. In some cases, the reliability and availability requirements placed on the devices powering the data center infrastructure must meet or exceed predetermined statutory requirements, as is the case for financial institutions.

Regardless of the type of institution, various infrastructure requirements must be met in order to address the important issues of availability, reliability, job load, and other organizational requirements of data centers. For example, the issue of effectively cooling a data center (i.e. the removal of excess heat) is a critical issue which must be addressed to ensure stable and reliable operation of the data center. Each of the many devices in the data center generates substantial amounts of heat, whether the device is a server, a blade, a switch, a backup unit, a communications unit, or another device. The cooling of modern data centers can directly impact the layout and design of the center. Another significant data center design consideration involves providing sufficient power to the data center. Particularly in the case of high-reliability data centers, such as those used for e-commerce, banking, airline reservations, video distribution, and the like, power can be provided by more than one power grid, while for other data centers, power can be provided by a combination of a power grid and locally generated power. Thus, providing reliable and efficient power to the large number of computers and associated equipment in modern data centers or server farms is an important aspect contributing to the performance of these operations.

SUMMARY

Disclosed techniques enable power manipulation within a data center based on power policies for improving power utilization in the data centers. Power policies are used to establish behavior based on limits for power consumption, power generation, and other criteria. Rules are established to provide fractional power sharing and control under certain conditions. Power caches are used to supplement power sources under conditions of peak power requirements. When power requirements are below a threshold set forth in a power policy, the power caches are replenished. The power policies enable a convenient and effective way to manage the dynamic requirements of a modern data center. These policies enable increased power utilization and greater efficiency given a specific set of power sources and supplies. By use of policies, underused and unexploited power capabilities can be unlocked to enhance power utilization within a data center. In some cases, power policies can be employed to reduce overall costs of utility power provided to data centers.

Embodiments can include a processor-implemented method for power manipulation comprising: coupling a power source across a plurality of data racks to a power load within a data center; coupling a power cache to the power load; providing power for the power load from the power source; and enabling the power cache to provide power to the power load when power requirements of the power load exceed limits of the power source wherein the limits are defined by a set of power policies for the data center.

Various features, aspects, and advantages of various embodiments will become more apparent from the following further description.

BRIEF DESCRIPTION OF THE DRAWINGS

The following detailed description of certain embodiments may be understood by reference to the following figures wherein:

FIG. 10 illustrates JSON code for policies.

DETAILED DESCRIPTION

Figure 1:
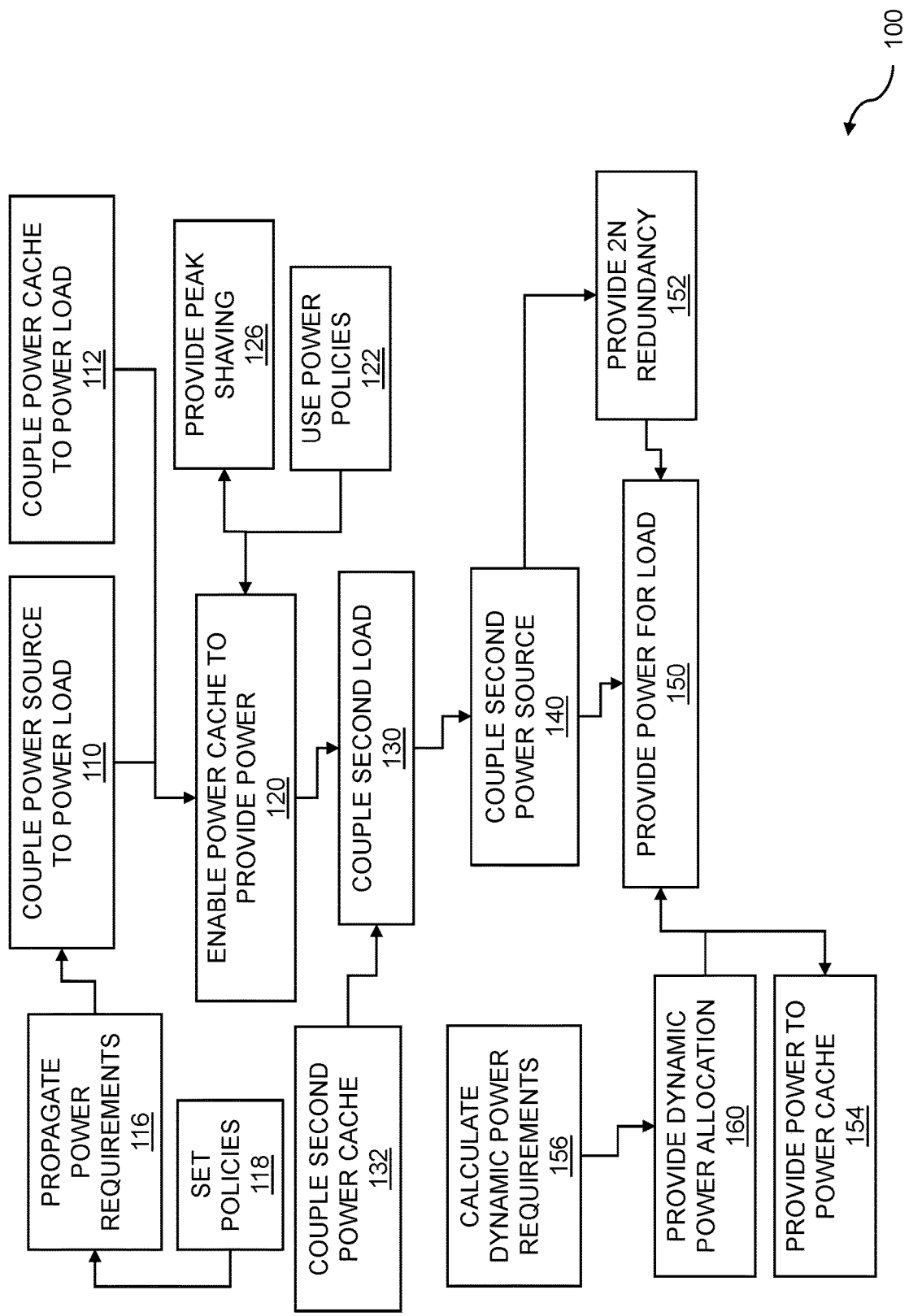
FIG. 1 is a flow diagram for power manipulation.

Data centers can contain hundreds, or even thousands, of computers and other associated equipment, such as disk arrays, data backup, routers, and other networking and storage equipment. Managing power distribution for efficiency and reliability can be challenging. This disclosure provides techniques for data manipulation using power policies. The power policies are powerful tools for establishing behaviors of the power distribution system within a data center. Given certain constraints, such as peak operating power, peak duration, availability of alternate power sources, and the like, policies can be established regarding how power is to be allocated among various devices within the data center.

In disclosed techniques, a data center can include multiple power sources. For example, a data center can include two main power sources, each main source being capable of providing power for the entirety of equipment within the data center. This configuration provides 2N redundancy. In some cases, a main source can include a grid source, such as power provided by a utility company via a substation. The main source can further include one or more alternate sources in the form of a locally generated power. Additionally, the main source can include a power cache. The power cache can include, but is not limited to, a battery, a capacitor, and/or an electromechanical source. An electromechanical source can include flywheel-based energy storage, where the flywheel is spun by a power source during an energy surplus condition, and the flywheel drives a generator to provide power during periods of increased energy demand. An electromechanical source can include pumps that pump water to a higher potential during a period of energy surplus and then release the water during a period of increased energy demand in order to generate electricity. An electromechanical source can include compressors that compress air in a tank to a higher pressure during a period of energy surplus and then release the compressed air to power a generator during a period of increased energy demand in order to generate electricity. Other electromechanical power caches are possible. The power cache can be replenished by one or more sources. In some cases, the power cache can be replenished from the grid via power utilities. In other cases, the power cache can be replenished from an alternate source such as a diesel generator set, solar power, wind power, water power, and/or tidal power generation.

The data centers can have dynamic power requirements that result in uneven power consumption during operation. The dynamic power requirements can be attributable to factors such as job mix, user mix, time of day, day of month, time of year, etc. By use of power policies, data center power usage efficiency can be greatly increased and more processing units enabled with the same set of power sources. For example, a data center that is primarily used for overnight backup of data might have increased power consumption overnight, with lower power consumption during the day. In another example, a data center that is primarily used during business hours can have increased power consumption attributable to heating, ventilation, cooling, and air conditioning (HVAC), lighting, communications, and so on. Additionally, computerized load balancing can create conditions for dynamic power requirements that are unpredictable and require a fast response in order to accommodate them. For example, subscriber-based systems might have increased power requirements when many customers/users simultaneously log in to use a system or application. Exactly when the increased power requirements can happen may not be known a priori. Hence, the ability to establish power policies, including flexible policies, to define the behavior of power distribution within a data center under a variety of conditions enables power manipulation that can keep a data center running efficiently under a variety of conditions. Policies can enable peak provisioning within the same power infrastructure and can thereby reduce demand on utility power sources and other power sources. Power caches can be used to address peak requirements and to increase overall capabilities given limited resources.

FIG. 1 is a flow diagram for power manipulation. The flow 100 illustrates a processor-implemented method for power manipulation. The flow 100 includes coupling a power source across a plurality of data racks to a power load within a data center 110. This can include connecting at least two main sources to the data center. In embodiments, each main source provides enough power for the entire data center. When two such main power sources are used, it is referred to as 2N redundancy. In cases where two main power sources are used, one of the power sources can be referred to as an "A feed" and the other power source can be referred to as a "B feed." Within each main power source, multiple grid and/or alternate power sources and/or power caches can be providing power. The flow 100 includes coupling a power cache to the power load 112. The power cache can include, but is not limited to, a battery, a capacitor, and/or an electromechanical power storage system. In some cases, the power cache can include an array of batteries. The batteries may include, but are not limited to, lead-acid, nickel metal hydride (NiMH), lithium ion (Li-ion), nickel cadmium (NiCd), and/or lithium ion polymer (Li-ion polymer) batteries. The flow 100 includes enabling the power cache to provide power 120. This can include a fractional power sharing and control scheme where the power cache supplies a percentage of the power for a main power source.

The flow 100 includes setting power policies 118. The power policies can include limits along with one or more rules to establish actions to be executed when the limits of the power policy are reached. Example limits can include, but are not limited to, power consumption limits, power storage limits, equipment operating temperatures, equipment operating durations, expected load requirements, ambient temperatures, and the like. More than one power policy can be used, forming a set of power policies. In embodiments, dynamically allocating power is based on the set of power policies. The set of power policies can include one or more of a power limit for the power source, a power limit for the power load, a minimum state of charge for the power cache, a maximum power assistance value for the power cache, or a drain rate for the power cache. The set of power policies can include a group power policy. The group power policy can include one or more of a power limit for a group of data racks, a target power value for a group of data racks, or a group power capacity limit. Embodiments include determining a data rack policy for a power supply within a data rack from the plurality of data racks, based on the group policy. The power supply can perform power conditioning, voltage conversions, and/or other functions to provide suitable power for equipment installed in data racks. The flow includes propagating the power requirements 116 that are established in the policies. This can include propagating the requirements to power loads, power sources, and/or power cache devices. For example, a power policy can include a maximum continuous operation duration for a diesel generator, and a maximum downtime duration for the diesel generator. The maximum continuous operation can specify the maximum amount of time that the diesel generator can continuously operate. For example, if the maximum continuous operation is specified as three hours, then the value of three hours is propagated to a controller for the diesel generator. This protects the diesel generator from excessive wear and risk of overheating. Similarly, the maximum downtime duration can specify the maximum duration between activations of the diesel generator. For example, if the maximum duration between activations is set to ten days, then the value of ten days is propagated to the controller for the diesel generator. This means that, at a minimum, the diesel generator will be activated at least once within a ten-day period. This can help increase reliability of the diesel generator, since remaining unused for a long duration can cause reliability issues with internal combustion engines such as fuel spoilage, rubber parts deterioration, and so on. In other cases, a policy can be set so that a generator is used to handle peak power requirements for three hours or fewer. The power policy can specify an AC voltage based on a root-mean-square (RMS) average. The power policy can specify a power factor for a load, where the power factor (pf) is defined as the cosine of the phase difference between the current through and voltage across the load. These are just some of the examples of power requirements that can be propagated within the system. The power policy can also account for various system variables, such as the level in a fuel tank of a diesel generator, since the fuel level determines the amount of operation time possible for the generator. When the fuel level is below a predetermined threshold, the diesel generator can be taken offline until its fuel supply can be replenished. Another such variable can be the coolant temperature of the diesel generator. If the coolant temperature exceeds a predetermined threshold, the diesel generator can be taken offline, and power can be retrieved from another power source. In some cases, power policies can be set for handling power caches. The power policy for a power cache can include a maximum duration of drain set for a power cache as well as a maximum duration for charging a power cache. Through the use of power caches, power usage can be flattened from utility grids. In some cases, power caches can be used to reduce the cost of power from utility grids by using the power caches to provide power when utility power cost is high such as during the day, and charging the power caches from utility power when utility power cost is low such as at night. With power policies, more IT equipment can be deployed for the same power footprint usage to a data center.

The flow 100 includes using power policies 122. The flow 100 can further include providing peak shaving 126. The peak shaving allows power caches to be replenished when the power load is drawing less power than a predetermined threshold limit that is established by a power policy. Furthermore, the peak shaving allows power caches to supplement power provided to a data center when the power load is drawing more power than a predetermined threshold limit that is established by a power policy.

The flow 100 includes coupling a second load 130 to the power source. The second load can be an additional data rack, an additional cluster of data racks, and/or an additional group of data racks, where a group contains multiple clusters. The flow 100 includes coupling a second power source 140 to the system. Embodiments include coupling a second power source across the plurality of data racks. The second power source can include an alternate grid source, such as a second substation from the providing utility company. In this way, if a first substation shuts down, a second substation can continue to provide power. In some cases, the second power source 140 can include a local power source such as a diesel generator, solar panel array, wind turbine array, and/or hydroelectric power. In some cases, the first and second power sources can each be main power sources that can power the entirety of a data center. The solar panel array can include multiple solar panels. A solar panel is a packaged, connected assembly of photovoltaic cells. Each panel is rated by its DC output power under standard test conditions and typically ranges from 100 to 320 watts. Solar panels use light energy (photons) from the sun to generate electricity through the photovoltaic effect.

Embodiments include setting a group policy for the power source and a second power source. In such cases, the first and second power source can be configured to provide 2N redundancy 152. The flow 100 continues with providing power for the load 150. The flow 100 can include coupling a second power cache 132 to the power load and the second power load. The second power cache can include, but is not limited to, a battery, a capacitor, and/or an electromechanical power storage system.

The flow 100 includes calculating dynamic power requirements 156. Factors for calculating the dynamic power requirements can include, but are not limited to, expected usage (number of logged in users, active processes running, or the like) of the data center, actual usage of the data center, operating temperature of equipment, forecast weather conditions, and the like. For example, if the weather forecast is predicting an unusually hot weather pattern, the increase in overall power consumption for the area due to increased air conditioning usage can be anticipated. In such a case, it can be planned to supplement power to a data center with power caches during the anticipated peak power demand period for the area. Another factor can be expected peak usage times for a data center. For example, if a data center is involved in scheduled data backup operations, peak demand can be anticipated for the time of the backup operations. The flow 100 includes dynamically allocating power from the power source 160 across the plurality of data racks. This can include increasing the power allocation during the times of peak usage based on the calculated power requirements. The dynamically allocating power can be based on the set of power policies. In embodiments, dynamically allocating power from the power source and the second power source is based on the set of power policies. Furthermore, embodiments include dynamically allocating power from the power source and the second power source across the plurality of data racks.

The flow 100 includes providing power to a power cache 154. The power caches can be replenished based on the calculated power requirements. For example, during a period of hot weather in an area with high air conditioning usage, the available power from grid sources can be increased at night, while the temperature is cooler and the cost of power from grid sources is lower. During the periods of reduced ambient temperature, power can be provided to the power cache to replenish it for the next demand cycle. Through associated policies, reduced power costs can be obtained through using power caches when costs are high recharging caches when power costs are lower. The power cache can include, but is not limited to, batteries, capacitors, and/or electromechanical systems such as water-based, compressed-air based, and flywheel based systems. Thus, embodiments include providing power into the power cache when the power requirements of the power load are lower than limits for the power source. Power repatriation can be accomplished by restoring capabilities, using power policies, that would otherwise be providing unneeded power overhead for a data center. Various steps in the flow 100 may be changed in order, repeated, omitted, or the like without departing from the disclosed concepts. Various embodiments of the flow 100 can be included in a computer program product embodied in a non-transitory computer readable medium that includes code executable by one or more processors.

Figure 2:
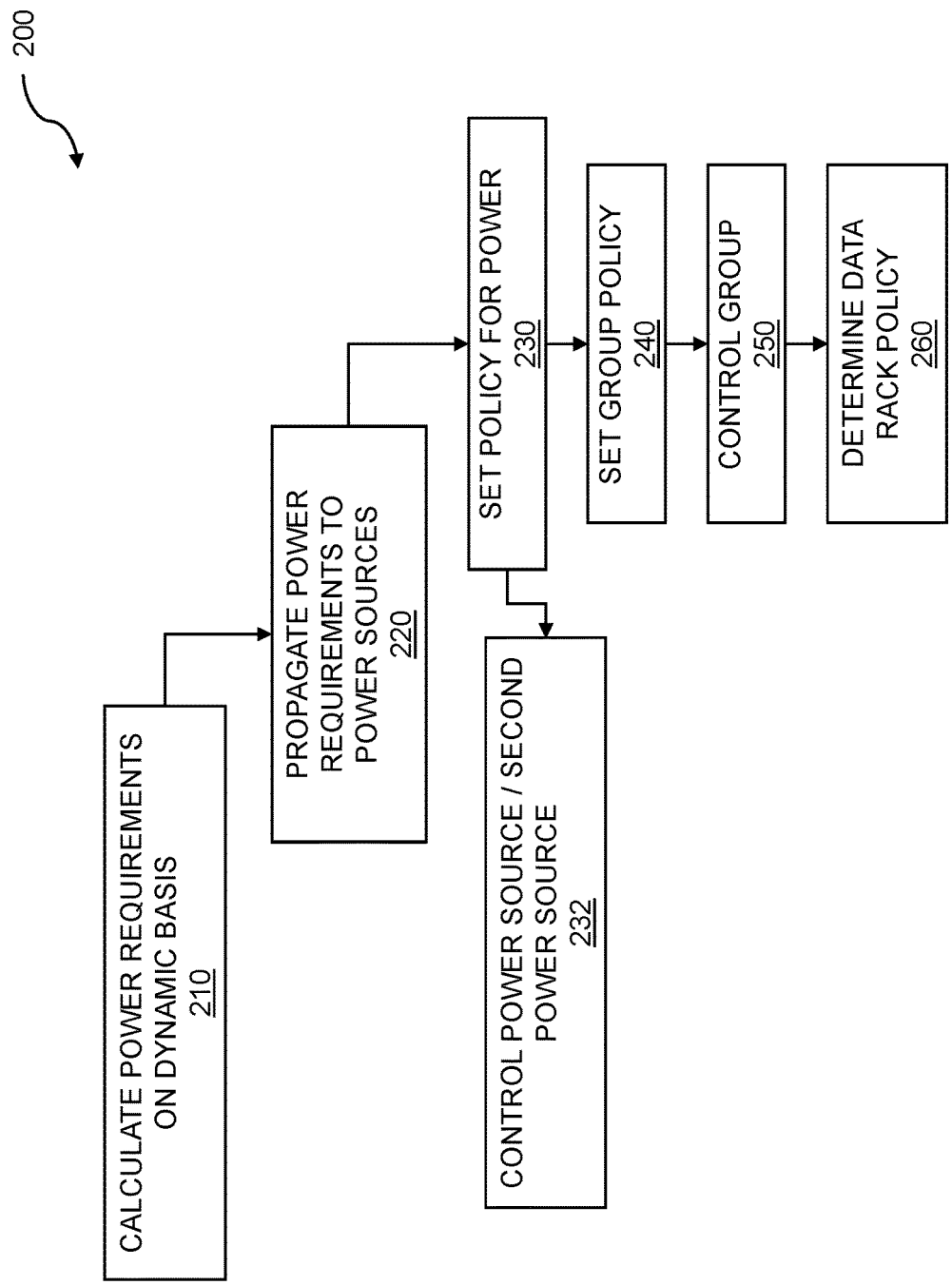
FIG. 2 is a flow diagram for calculating power requirements and determining policies.

FIG. 2 is a flow diagram for calculating power requirements and determining policies. The flow 200 includes calculating the power requirements of the power load on a dynamic basis 210. Factors for calculating the dynamic power requirements can include, but are not limited to, expected usage (number of logged in users, active processes running, or the like) of the data center, actual usage of the data center, operating temperature of equipment, forecast weather conditions, and the like. The flow 200 includes propagating information on the power requirements to the power sources 220. The information can include power cache parameters such as minimum charge levels, maximum charge levels, minimum number of charge/discharge cycles over a given duration, and the like. The information can include power load parameters, such as maximum peak power consumption. The information can include power source parameters, such as maximum supplied peak power, maximum supplied average power, maximum RPM value for a diesel generator, and the like. The flow 200 includes setting a power source policy for the power source 230. The policy can include an upper limit on power to be provided, a duration of the power to be provided, or a reliability to be maintained. The policy can further include rules for activation of switches based on the state of a main source (feed). The flow 200 includes controlling the power source 232 according to the power source policy that was set. This can include controlling a fractional contribution of a local source such as a diesel generator, as well as operating parameters for power source, such as, for example, a maximum operating duration for a diesel generator. In embodiments, the flow includes controlling the power source and the second power source according to the group policy that was set. The flow 200 includes setting a group policy 240 for the power source and a second power source. The flow 200 includes controlling the group 250 according to the group policy that was set. The flow 200 includes determining a data rack policy 260 for a power source within a data rack from the plurality of data racks, based on the group policy. In embodiments, a data center is comprised of multiple groups. Each group can be comprised of multiple clusters. Each cluster can be comprised of multiple data racks, and each data rack can include one or more computers, power caches, power supplies, and/or additional computer peripheral equipment. Various steps in the flow 200 may be changed in order, repeated, omitted, or the like without departing from the disclosed concepts. Various embodiments of the flow 200 can be included in a computer program product embodied in a non-transitory computer readable medium that includes code executable by one or more processors.

Figure 3:
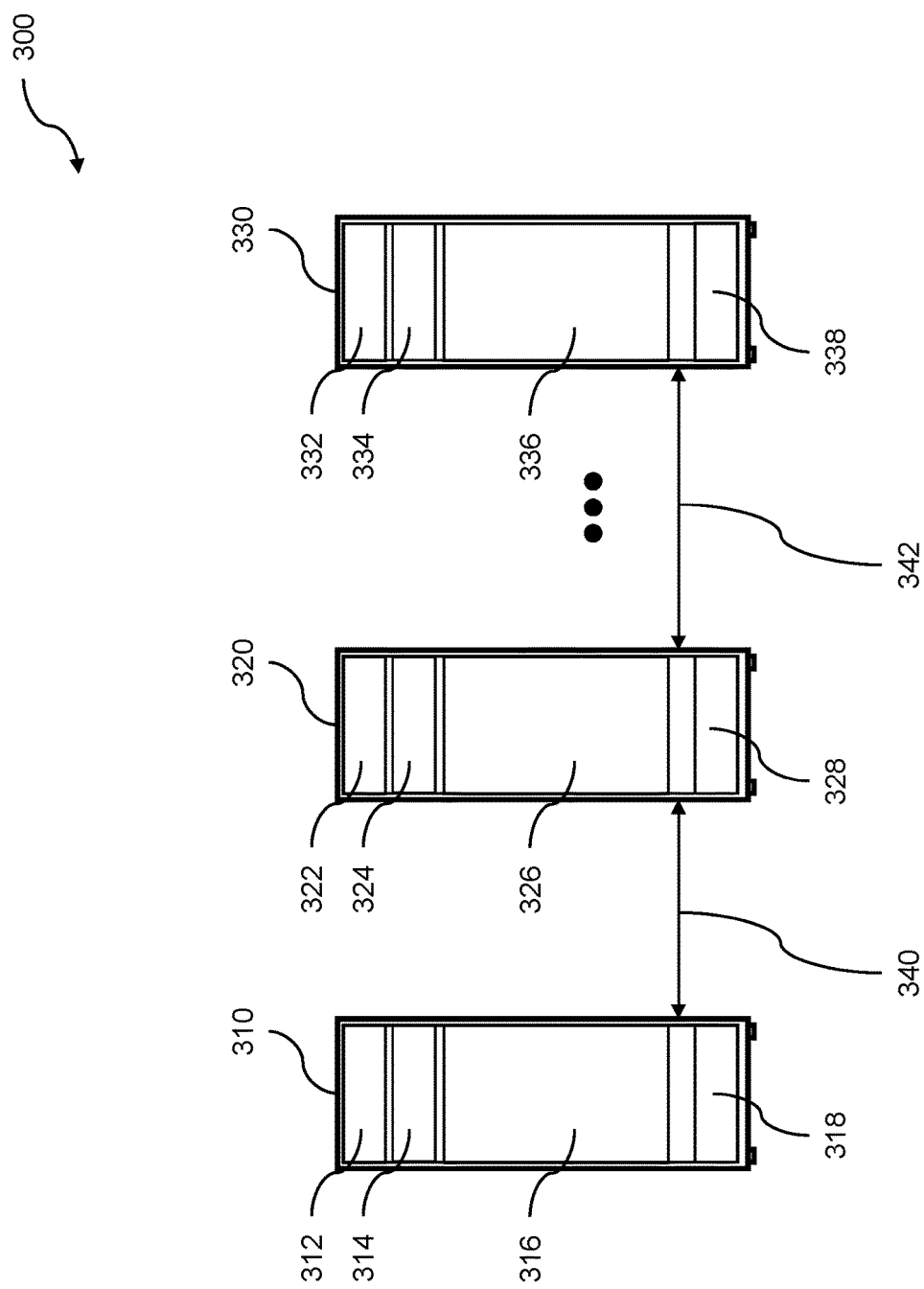
FIG. 3 shows data rack power and control communication.

FIG. 3 shows data rack power and control communication. A data center can include multiple data racks. Example 300 includes three data racks, indicated as rack 310, rack 320, and rack 330. While three data racks are shown in example 300, in practice, there can be more or fewer data racks. The data rack 310 includes a power cache 312, a server 314, a server 316, and a power supply 318. The power supply 318 can be used for AC-DC conversion and/or filtering of power to be used by the servers 314 and 316, as well as replenishment of the power cache 312. In embodiments, the power cache 312 includes an array of rechargeable batteries. In embodiments, the batteries include, but are not limited to, lead-acid, nickel metal hydride (NiMH), lithium ion (Li-ion), nickel cadmium (NiCd), and/or lithium ion polymer (Li-ion polymer) batteries. Similarly, the data rack 320 includes a power cache 322, a server 324, a server 326, and a power supply 328. Furthermore, the data rack 330 includes a power cache 332, a server 334, a server 336, and a power supply 338. The data racks are interconnected by communication links 340 and 342. The communication links can be part of a local area network (LAN). In embodiments, the communication links include a wired Ethernet, Gigabit Ethernet, or another suitable communication link. The communication links enable each data rack to send and/or broadcast current power usage, operating conditions, and/or estimated power requirements to other data racks and/or upstream controllers such as a cluster controller. Thus, in the example 300, a power cache can be on each of the multiple data racks within the data center. In embodiments, the power cache includes multiple batteries spread across the multiple data racks.

Figure 4:
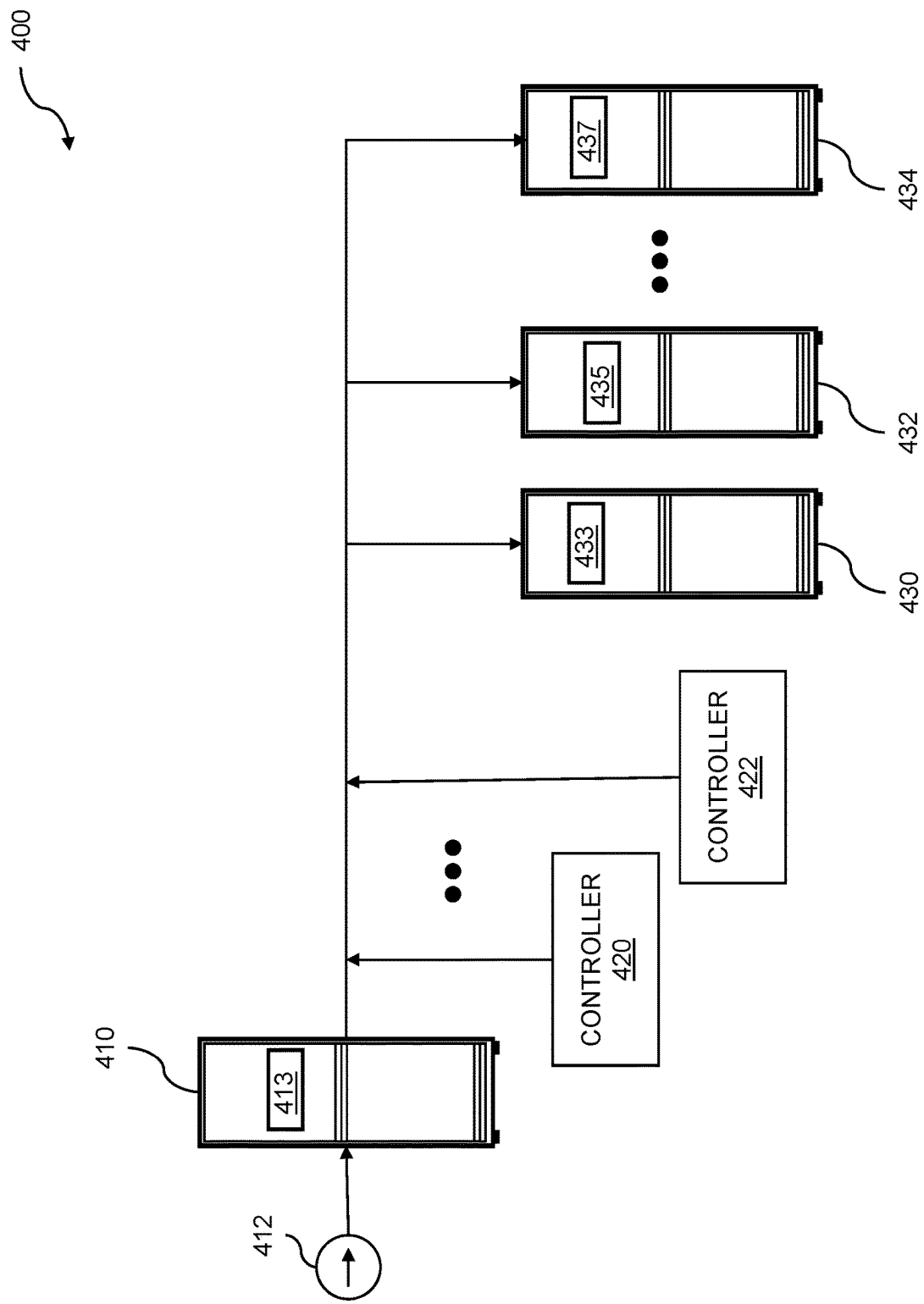
FIG. 4 illustrates fractional power sharing and control.

FIG. 4 illustrates fractional power sharing and control. In the example 400, the power source and a second power source can share power to the multiple data racks, wherein the power is shared on a fractional basis. The example 400 includes a grid power source 412, and multiple secondary power sources. Each data rack includes a power cache within it, where the power cache can serve as a second power source. The data rack 410 includes a power cache 413. The data rack 430 includes a power cache 433. The data rack 432 includes a power cache 435. The data rack 434 includes a power cache 437. In embodiments, the power caches (413, 433, 435, and 437) include an array of rechargeable batteries. In embodiments, the batteries include, but are not limited to, lead-acid, nickel metal hydride (NiMH), lithium ion (Li-ion), nickel cadmium (NiCd), and/or lithium ion polymer (Li-ion polymer) batteries.

Each data rack includes a power load. In embodiments, the power load includes, but is not limited to, a computer, a disk array, a router, a printer, a network appliance, a network termination device, a bridge, an optical transmission driver, and/or another computer peripheral. Thus, as shown in example 400, there are multiple power loads, including a first power load and a second power load. The power source can provide power to the power load and the second power load. Furthermore, the power cache can provide power to the power load and the second power load.

A controller 420 and a controller 422 communicate with the data racks (410, 430, 432, and 434) in the example 400. While two controllers are illustrated in the example 400, in practice, there can be more or fewer controllers. In embodiments, the controllers are computers that are configured to receive data from the data racks. The data can include operating parameters such as current power consumption, peak power consumption, estimated future power consumption, current operating temperature, and the like. Additionally, warnings, alarms, and/or faults can be communicated to the controllers. The warnings can include over-temperature warnings, failed component errors, and the like. In some situations, a controller can shut down or disable an entire rack based on the communicated information from the data rack. In some situations, a controller can bring a different data rack out of standby to take the place of a data rack that has been shut down.

The controllers can implement fractional power sharing and control. For example, during a peak power demand period, eighty percent of the power can be provided by a grid power source 412, while the remaining twenty percent of the power can be provided by the power caches within each data rack. During periods of lower power consumption, the power caches are recharged, enabling them to be used again during a future period of increased power consumption.

Figure 5:
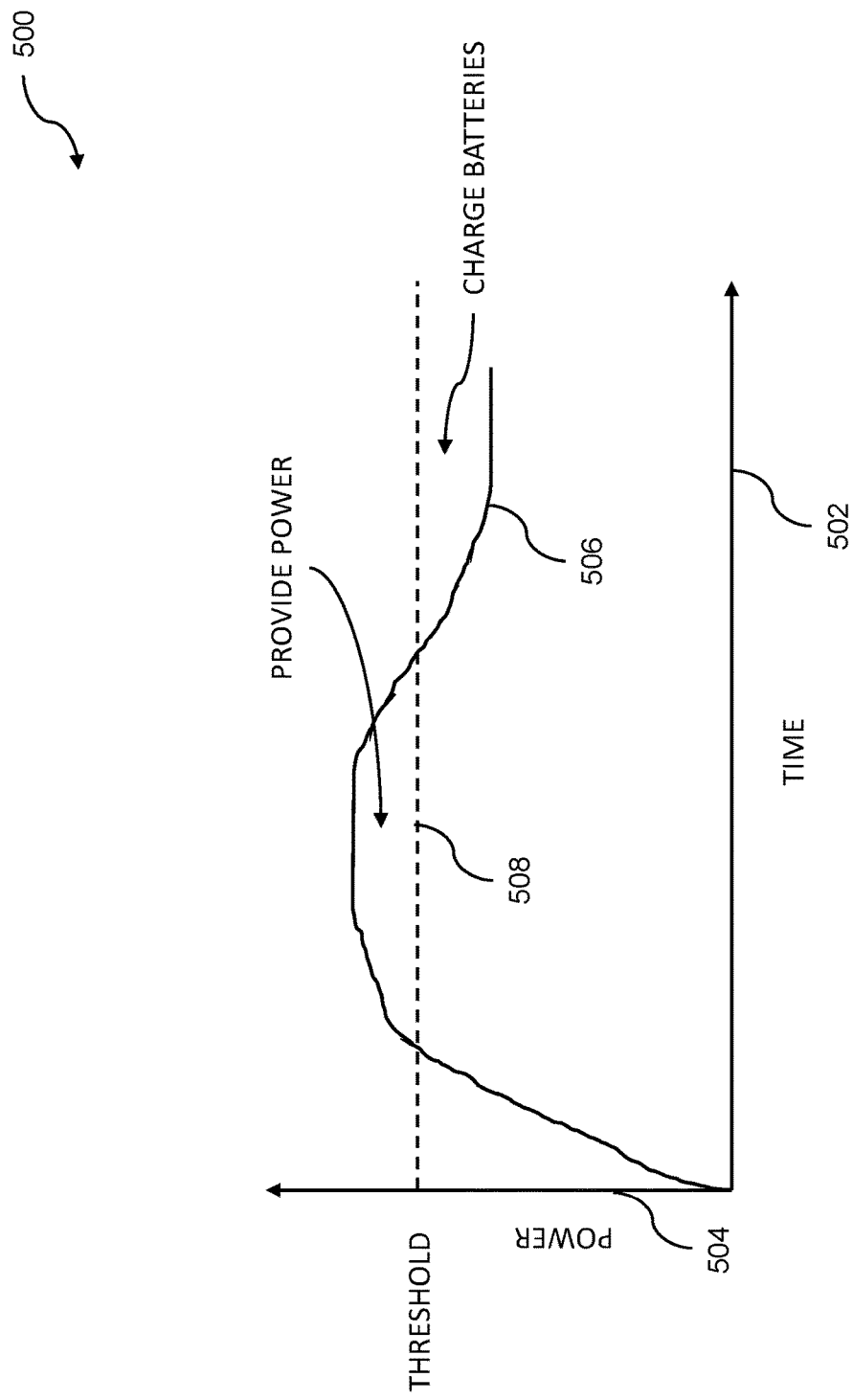
FIG. 5 illustrates peak shaving.

FIG. 5 illustrates peak shaving. A graph 500 includes a horizontal axis 502 representing time and a vertical axis 504 representing power consumption of a power load (such as a data center group, cluster, or data rack). A predetermined threshold 508 is established based on a power policy. The power policy can be defined by an administrator at the data center, a local power utility, or the like. The curve 506 represents the power consumption of a power load over time. During periods where the curve 506 is above the threshold 508, power is provided to the load by the power cache. During periods where the curve 506 is below the threshold 508, the power cache is replenished. In the case where the power cache comprises one or more batteries, the batteries are charged when the curve 506 is below the threshold 508. In embodiments, enabling the power cache comprises peak shaving.

Figure 6:
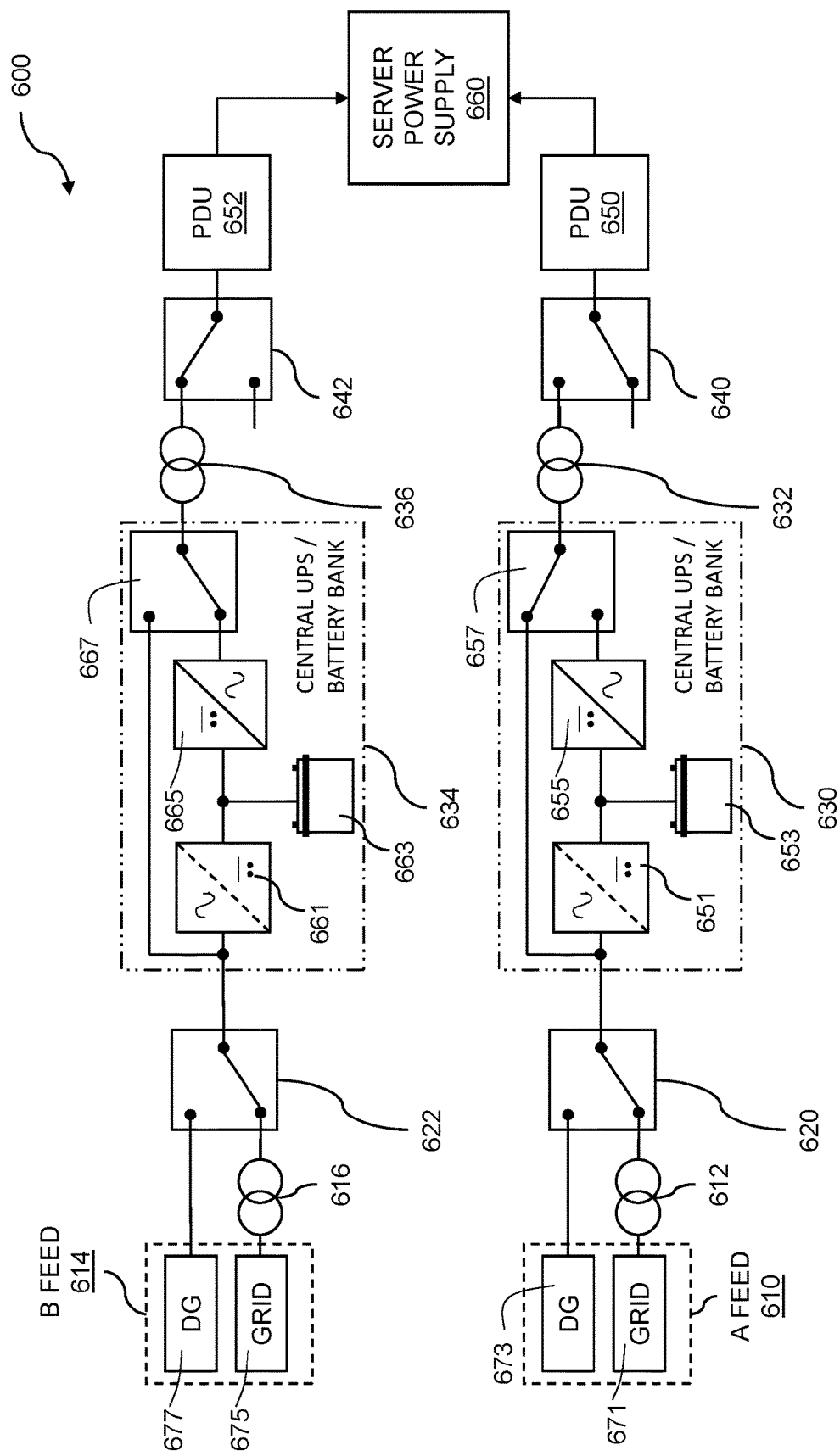
FIG. 6 illustrates 2N redundancy for power.

FIG. 6 illustrates 2N redundancy for power. The example 600 includes a first main power source 610, referred to as the "A feed." The example 600 further includes a second main power source 614, referred to as the "B feed." Each feed is capable of powering each device in the data center simultaneously. This configuration is referred to as 2N redundancy for power. The A feed 610 includes a grid source 671, and a secondary, local source of a diesel generator (DG) 673. The grid source 671 is input to a power regulator 612 and then into one input of a switch block 620. The diesel generator 673 is input to a second input of the switch block 620. The switch block 620 can be configured, based on a power policy, to select the diesel generator source or the grid source. The switch block 620 feeds into a power cache 630. The power cache 630 includes an AC-DC converter 651 configured to a charge battery 653, and a DC-AC converter 655 that feeds into an input of a switch block 657. The output of the switch block 620 feeds into a second input of the switch block 657. The output of the power cache 630 is input to a power regulator 632, and then to an input of a switch block 640. The switch block 657 can be configured, based on a power policy, to provide power from the power cache, or bypass the power cache and provide power directly from the local or grid power source. The second input of the switch block 640 is not connected, such that if the second input is selected, the A feed 610 is disconnected from the PDU 650. The PDU (Power Distribution Unit) distributes power within a data center and feeds the server power supply 660 of a server within a data rack in the data center. In embodiments, the main data center power is distributed to multiple power distribution units (PDUs), typically rated from 50 kVA to 500 kVA, throughout the data center premises. The PDU can include transformer-based and/or non-transformer distribution units. PDUs can be supplied from centralized breakers and are generally placed along the perimeter of the space, throughout the room. The PDU can have a data rack form factor that allows placement adjacent to a row of data racks enabling power distribution closer to the load. Branch circuits are distributed from the PDUs to the data racks. Each data rack enclosure uses one or more branch circuits.

Similarly, the B feed 614 includes a grid source 675, and a secondary, local source of a diesel generator (DG) 677. The grid source 675 is input to a power regulator 616 and then into one input of a switch block 622. The diesel generator 677 is input to a second input of the switch block 622. The switch block 622 can be configured, based on a power policy, to select the diesel generator source or the grid source. The switch block 622 feeds into a power cache 634. The power cache 634 includes an AC-DC converter 661 configured to a charge battery 663, and a DC-AC converter 665 that feeds into an input of a switch block 667. The output of the switch block 622 feeds into a second input of a switch block 667. The switch block 667 can be configured, based on a power policy, to provide power from the power cache, or bypass the power cache and provide power directly from the local or grid power source. The output of the power cache 634 is input to a power regulator 636, and then to an input of a switch block 642. The second input of the switch block 642 is not connected, such that if the second input is selected, the B feed 614 is disconnected from the PDU 652, which in turn feeds the server power supply 660 of a server within a data rack in the data center. Thus, the A feed 610 and the B feed 614 comprise a first main power source and a second main power source. The power source and the second power source can provide 2N redundancy to the power load. Furthermore, in embodiments, the power source and a second power source share power to the multiple data racks, wherein the power is shared on a fractional basis. Embodiments include coupling a second power load to the power source. Embodiments include coupling a second power cache to the power load and the second power load. In embodiments, the power cache provides power to the power load and the second power load. Furthermore, in embodiments, the power source provides power to the power load and the second power load.

As shown in the example 600, the system is currently configured, based on a power policy, such that the A feed 610 is disconnected from the server power supply 660 based on the mode of the switch block 640. The power cache 630 is currently set to bypass mode based on the mode of the switch block 657. The power source for the A feed is currently selected as the grid source 671 based on the mode of the switch block 620.

Furthermore, as shown in the example 600, the system is currently configured, based on a power policy, such that the B feed 614 is connected to the server power supply 660 based on the mode of the switch block 642. The power cache 634 is currently set to active mode based on the mode of the switch block 667, where power is being drawn from the battery 663. Thus, the switch block 667 is configured such that the power cache is enabled. Embodiments include coupling a power cache on each of the multiple data racks within the data center. The enabling the power cache can include peak shaving. The power source for the B feed is currently selected as the grid source 675 based on the mode of the switch block 622.

A variety of power policies can be established based on rules and limits for power loads, power sources, and power caches. The settings of the various switch blocks can be established as execution rules when certain criteria are met. In this way, power policies can reconfigure the various switch blocks for optimal operation under a variety of dynamically changing conditions. In embodiments, the power source and the second power source provide 2N redundancy to the power load.

Figure 7:
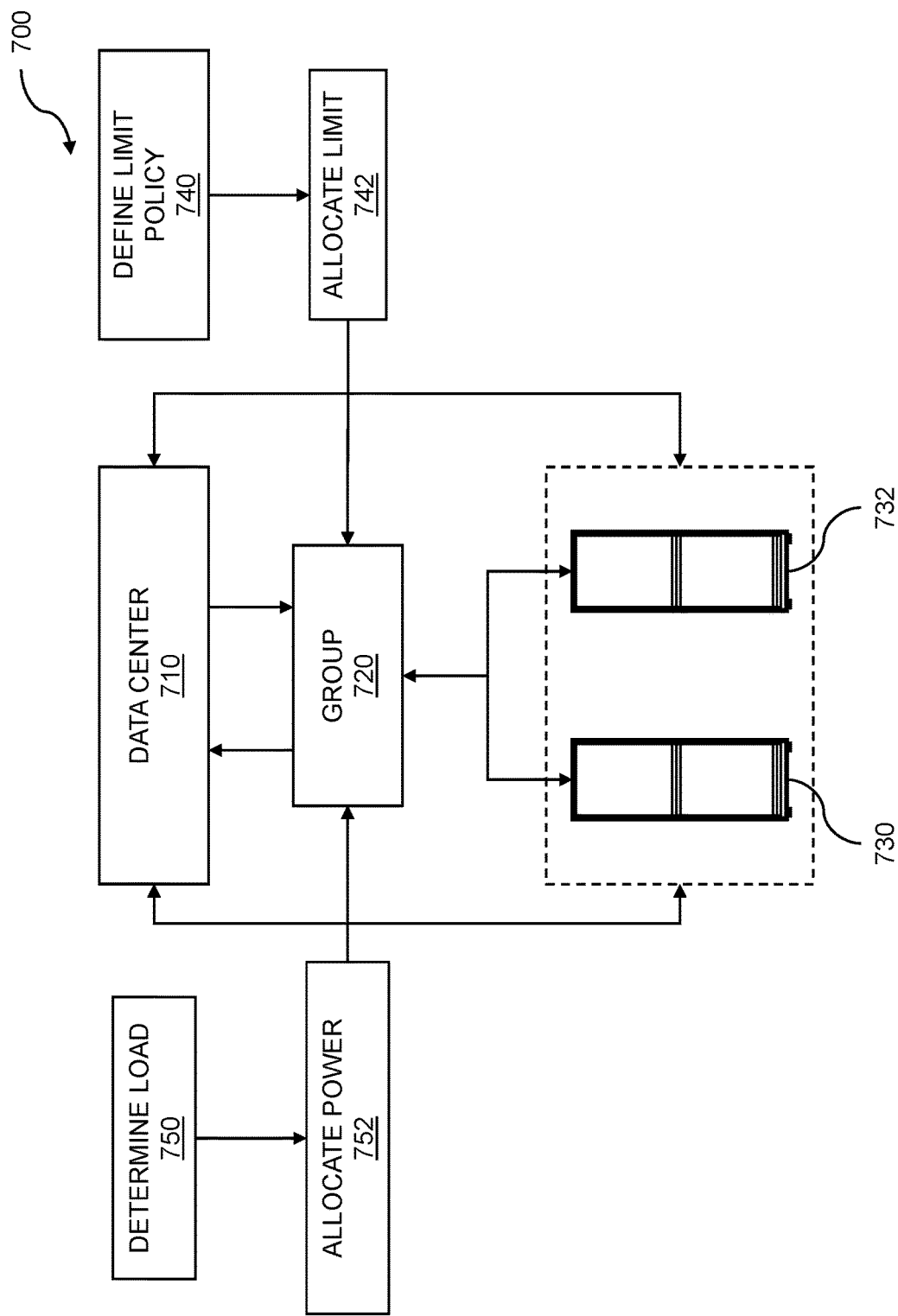
FIG. 7 shows limit allocation.

FIG. 7 shows limit allocation. An example 700 includes a data center 710. The data center includes one or more groups, each group comprising one or more data racks. A limit policy is defined 740, which specifies a maximum amount of power that is allowed to be used. The limit is allocated 742 and provided to group 720. In the example 700, the load is determined 750. The load can be determined based on estimated data and/or can include factors based on actual performance reported by the data racks 730 and 732. The dynamic power allocation can allocate power 752 across the multiple data racks based on time-sensitive power requirements of power for each of the data racks within the multiple data racks.

Thus, the data racks 730 and 732 can comprise a power load. The limit policies can specify the amount of available power. The power is provided to a group, and the policies are propagated to the group and its hierarchical downstream devices. The group 720 can report power information for that group upstream to the data center 710. Power policies can determine which racks, clusters, and/or groups are fully enabled, partially enabled, and/or disabled, based on current power availability and power load requirements.

Figure 8:
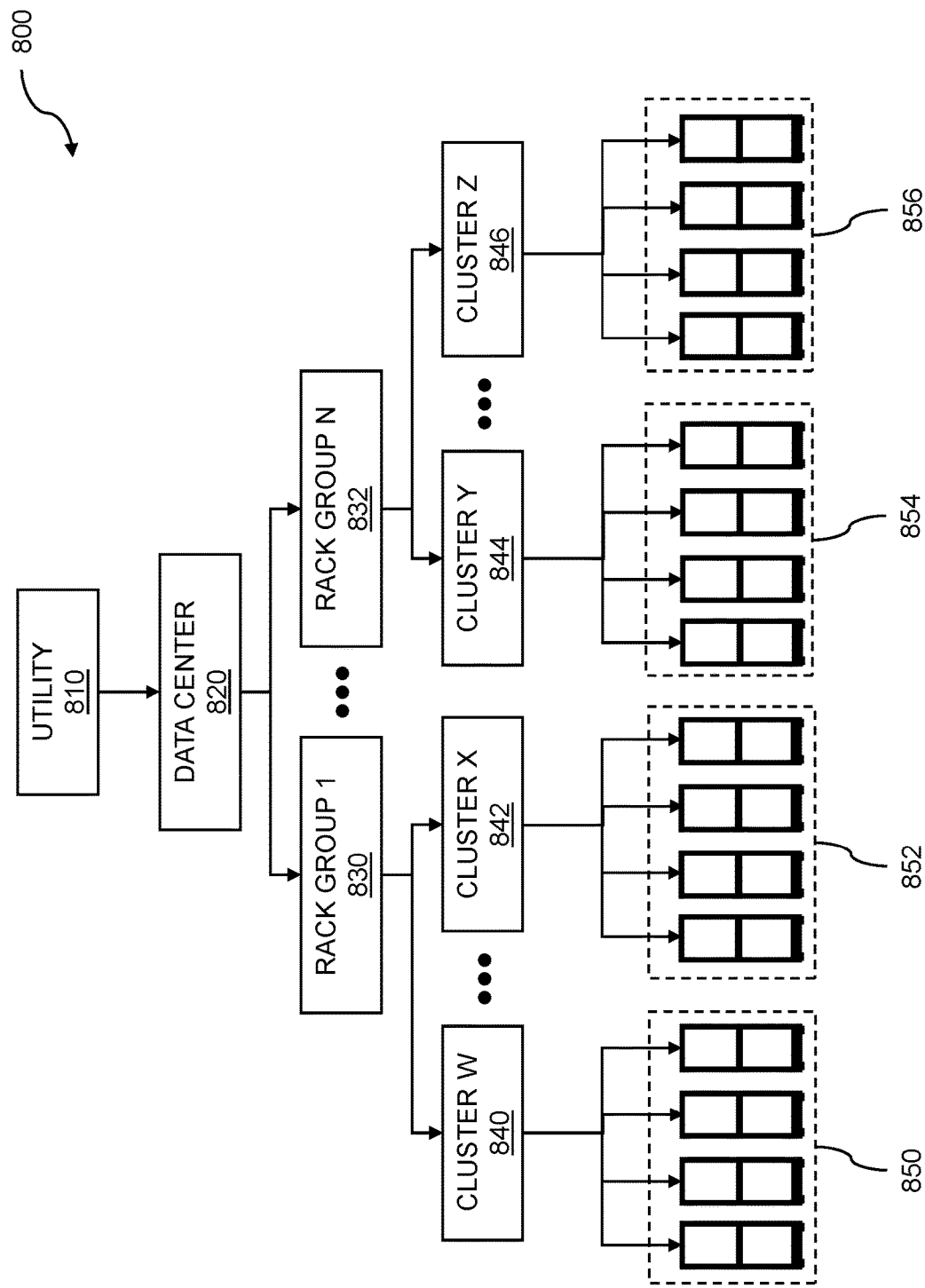
FIG. 8 illustrates hierarchical allocation of power control.

FIG. 8 illustrates hierarchical allocation of power control. The example 800 includes a utility 810 as the top level of the hierarchy. The utility can include a local or regional energy provider. The example 800 further includes a data center 820 that receives power from the utility 810. Within the data center 820, the next downstream level of the hierarchy is the group level. The group level includes multiple groups, indicated as rack group 1 830 and rack group N 832. Each group can have a group policy. The group policy can include a hierarchical set of policies. Within the groups, the next downstream level of the hierarchy is the cluster level. The group 830 includes multiple clusters, indicated as clusters 840 and 842. The group 832 includes multiple clusters, indicated as clusters 844 and 846. Thus, in embodiments, the data center comprises a plurality of clusters of data racks. Each cluster includes multiple data racks. The luster 840 includes the data racks 850. The cluster 842 includes the data racks 852. The cluster 844 includes the data racks 854. The cluster 846 includes the data racks 856. Thus, the data center can include a plurality of clusters of data racks. In embodiments, the power cache comprises multiple batteries spread across the multiple data racks. Embodiments include dynamically allocating power from the power source across the plurality of data racks.

During operation of the system, power policies are propagated downstream from the data center 820 to the group level, and from the group level to the cluster level, and from the cluster level to the data rack level. The data center comprises multiple data racks. Operating conditions and/or power requirements are sent upstream. Thus, each data rack reports operating information to a cluster controller within its corresponding cluster. Each cluster reports operating information to a group controller within its corresponding group. Each group reports operating information to a data center controller. In this way, information, status, and operating conditions can quickly propagate through the system to allow power policies to act on that information in a timely manner.

Figure 9:
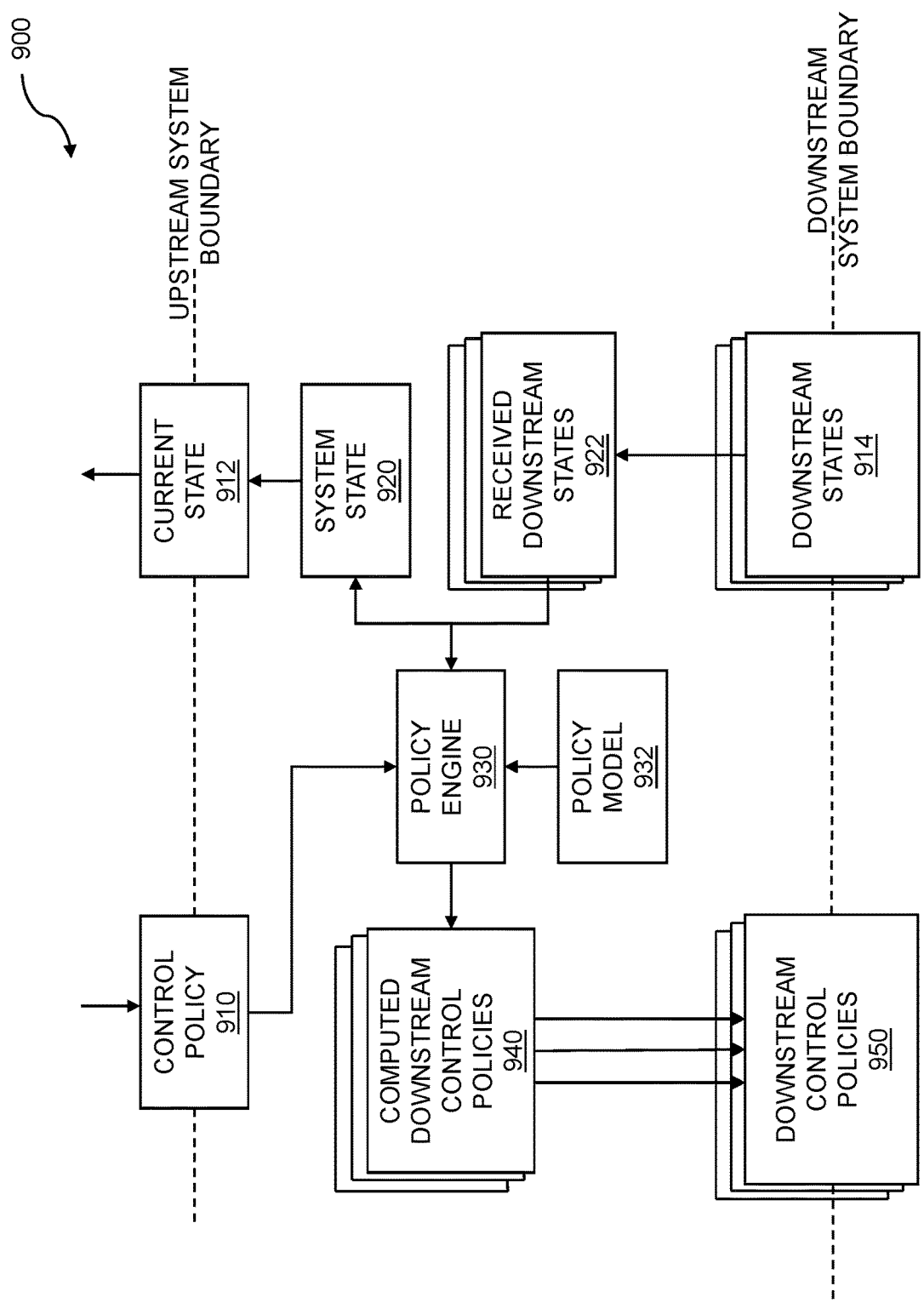
FIG. 9 shows control system internals.

FIG. 9 shows control system internals. The example 900 includes a policy engine 930 that receives a policy model 932 and a control policy 910. This control policy can come from upstream and be a power requirement from a higher level in the hierarchy. The control policy 910 can include an overall constraint or limit. For example, the control policy 910 can include establishing a maximum instantaneous consumption power limit of 1200 kW. The policy model 932 contains implementation rules for how to achieve the constraints of the control policy 910. For example, the policy model 932 can define rules for activating and/or deactivating power sources and/or power caches. The example 900 can include enabling the power cache to provide power to the power load when power requirements of the power load exceed limits of the power source, wherein the limits are defined by a set of power policies for the data center. The policy engine can then output computed downstream control policies 940 based on the policy model 932. These are passed down to the next lower hierarchy level as downstream control policies 950.

Downstream states 914 are passed upwards to be received by the downstream states 922 of the policy engine 930. The downstream states can include power consumption rates, estimated power demand, operating temperatures of equipment, overheating conditions, and the like. The policy engine 930 outputs a system state 920 which is passed upstream as the current state 912. In embodiments, states include, but are not limited to, online, offline, fault, cache enabled, cache disabled, cache charging, and/or cache discharging.

FIG. 10 illustrates JSON (JavaScript Object Notation) code for policies. The set of power policies can include one or more of a power limit for the power source, a power limit for the power load, a minimum state of charge for the power cache, a maximum power assistance value for the power cache, or a drain rate for the power cache. As indicated in the example 1000, the policy can include a utility limit, which is a maximum utility draw in watts. The policy can include a peak shave limit, which is the maximum draw from a power cache in watts. The policy can include a peak shave state-of-charge, which is a level (in a percentage) of charge below which peak shaving is disabled. The policy can include a flag to enable or disable peak shaving.

The policy can include group level policies. In embodiments, a group level policy includes a group target utility limit, which is the target utility power draw in watts to be maintained by the group of devices. The group level policy can also include a group maximum utility limit, which represents a value to avoid exceeding unless power cache levels are critically low. In embodiments, the group policy includes a hierarchical set of policies.

The power policy can include dynamic redundancy control for switch blocks. This can include an array of rules based on the enabled/disabled state of main power sources. Given the state of the power sources, the various switch blocks (as shown in FIG. 6) can be configured for using power from or replenishing power to the power caches.

Note that while the example 1000 shows a power policy implemented in JSON code, other methods of coding power policies are possible. These include, but are not limited to, a scripting language such as Python or Perl, a high-level programming language such as C or Java, and/or a table of limits and rules, such as a CSV formatted list of limits and rules.

Figure 11:
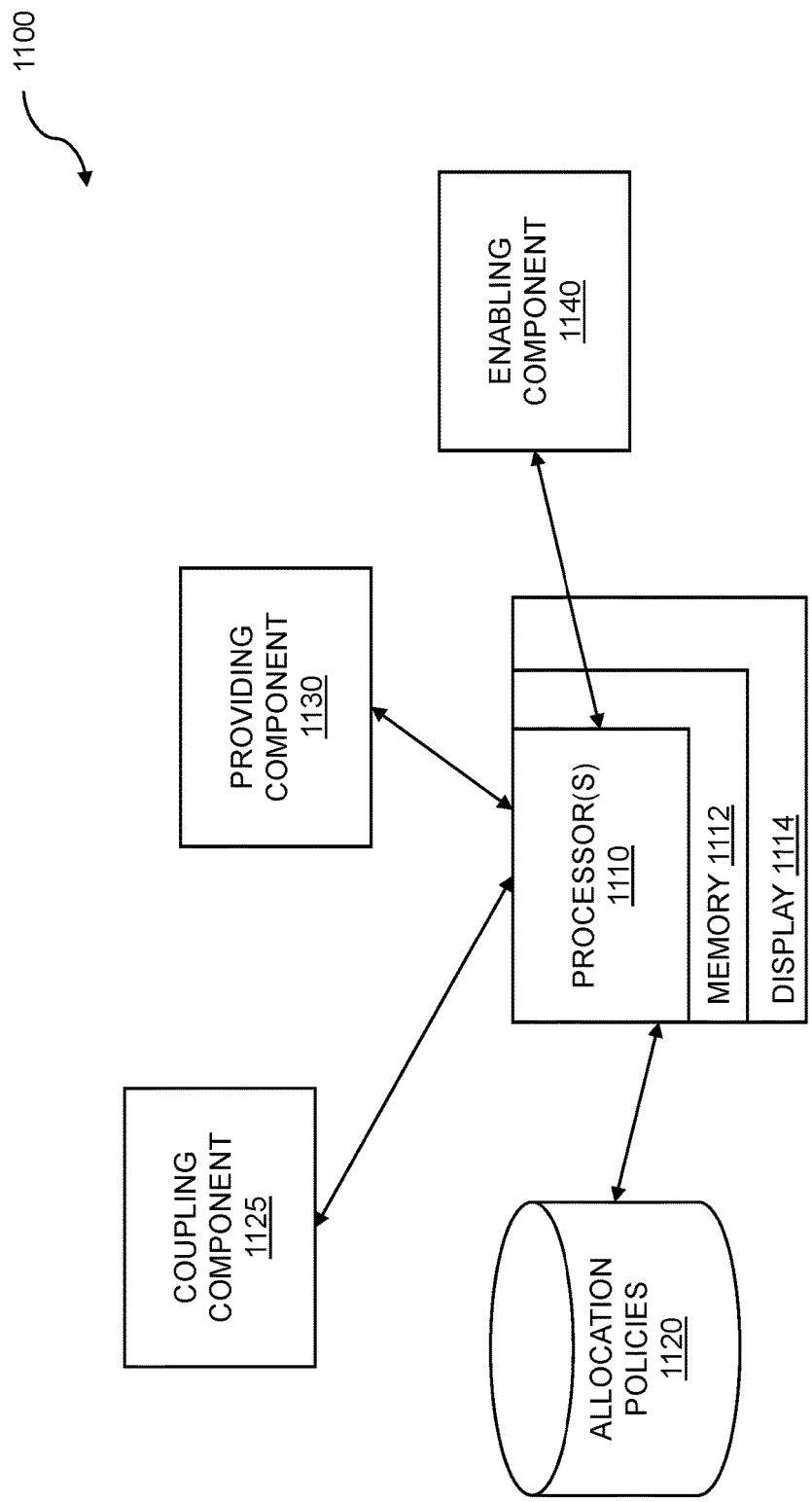
FIG. 11 is a system diagram for power manipulation.

FIG. 11 is a system diagram for power manipulation. The system 1100 can include one or more processors 1110 and a memory 1112 which stores instructions. The memory 1112 is coupled to the one or more processors 1110, wherein the one or more processors 1110 can execute instructions stored in the memory 1112. The memory 1112 can be used for storing instructions, for storing databases of power sources, power caches, and power loads, for storing information pertaining to load requirements, for storing information pertaining to redundancy requirements, for storing power policies, for system support, and the like. Information about the various power policies can be shown on a display 1114 connected to the one or more processors 1110. The display can comprise a television monitor, a projector, a computer monitor (including a laptop screen, a tablet screen, a net book screen, and the like), a cell phone display, a mobile device, or another electronic display.

The system 1100 includes allocation policies 1120. In embodiments, the allocation policies 1120 are stored in a networked database, such as a structured query language (SQL) database. The allocation policies 1120 can include limits, such as power consumption limits, as well as switch configurations when certain conditions are met. For example, when conditions allow peak shaving to take place, and surplus power exists, the power policies can identify switches and their configurations to allow replenishing of the power caches. The system 1100 further includes a coupling component 1125 that allows power sources to be coupled to power loads in a data center. The system 1100 can further include a providing component 1130 that provides power for the power load from the power source. The system 1100 further includes an enabling component 1140 that allows a power source, main power source, alternative power source, and/or a power cache, to be enabled or disabled.

The system 1100 includes a computer system for power manipulation comprising: a memory which stores instructions; one or more processors attached to the memory wherein the one or more processors, when executing the instructions which are stored, are configured to: couple a power source across a plurality of data racks to a power load within a data center; couple a power cache to the power load; provide power for the power load from the power source; and enable the power cache to provide power to the power load when power requirements of the power load exceed limits of the power source wherein the limits are defined by a set of power policies for the data center.

Disclosed embodiments can include a computer program product embodied in a non-transitory computer readable medium for power manipulation, the computer program product comprising code which causes one or more processors to perform operations of: coupling a power source across a plurality of data racks to a power load within a data center; coupling a power cache to the power load; providing power for the power load from the power source; and enabling the power cache to provide power to the power load when power requirements of the power load exceed limits of the power source wherein the limits are defined by a set of power policies for the data center.

Each of the above methods may be executed on one or more processors on one or more computer systems. Embodiments may include various forms of distributed computing, client/server computing, and cloud based computing. Further, it will be understood that the depicted steps or boxes contained in this disclosure's flow charts are solely illustrative and explanatory. The steps may be modified, omitted, repeated, or re-ordered without departing from the scope of this disclosure. Further, each step may contain one or more sub-steps. While the foregoing drawings and description set forth functional aspects of the disclosed systems, no particular implementation or arrangement of software and/or hardware should be inferred from these descriptions unless explicitly stated or otherwise clear from the context. All such arrangements of software and/or hardware are intended to fall within the scope of this disclosure.

The block diagrams and flowchart illustrations depict methods, apparatus, systems, and computer program products. The elements and combinations of elements in the block diagrams and flow diagrams, show functions, steps, or groups of steps of the methods, apparatus, systems, computer program products and/or computer-implemented methods. Any and all such functions—generally referred to herein as a "circuit," "module," or "system"—may be implemented by computer program instructions, by special-purpose hardware-based computer systems, by combinations of special purpose hardware and computer instructions, by combinations of general purpose hardware and computer instructions, and so on.

A programmable apparatus which executes any of the above mentioned computer program products or computer-implemented methods may include one or more microprocessors, microcontrollers, embedded microcontrollers, programmable digital signal processors, programmable devices, programmable gate arrays, programmable array logic, memory devices, application specific integrated circuits, or the like. Each may be suitably employed or configured to process computer program instructions, execute computer logic, store computer data, and so on.

It will be understood that a computer may include a computer program product from a computer-readable storage medium and that this medium may be internal or external, removable and replaceable, or fixed. In addition, a computer may include a Basic Input/Output System (BIOS), firmware, an operating system, a database, or the like that may include, interface with, or support the software and hardware described herein.

Embodiments of the present invention are neither limited to conventional computer applications nor the programmable apparatus that run them. To illustrate: the embodiments of the presently claimed invention could include an optical computer, quantum computer, analog computer, or the like. A computer program may be loaded onto a computer to produce a particular machine that may perform any and all of the depicted functions. This particular machine provides a means for carrying out any and all of the depicted functions.

Any combination of one or more computer readable media may be utilized including but not limited to: a non-transitory computer readable medium for storage; an electronic, magnetic, optical, electromagnetic, infrared, or semiconductor computer readable storage medium or any suitable combination of the foregoing; a portable computer diskette; a hard disk; a random access memory (RAM); a read-only memory (ROM), an erasable programmable read-only memory (EPROM, Flash, MRAM, FeRAM, or phase change memory); an optical fiber; a portable compact disc; an optical storage device; a magnetic storage device; or any suitable combination of the foregoing. In the context of this document, a computer readable storage medium may be any tangible medium that can contain or store a program for use by or in connection with an instruction execution system, apparatus, or device.

It will be appreciated that computer program instructions may include computer executable code. A variety of languages for expressing computer program instructions may include without limitation C, C++, Java, JavaScript™, ActionScript™, assembly language, Lisp, Perl, Tcl, Python, Ruby, hardware description languages, database programming languages, functional programming languages, imperative programming languages, and so on. In embodiments, computer program instructions may be stored, compiled, or interpreted to run on a computer, a programmable data processing apparatus, a heterogeneous combination of processors or processor architectures, and so on. Without limitation, embodiments of the present invention may take the form of web-based computer software, which includes client/server software, software-as-a-service, peer-to-peer software, or the like.

In embodiments, a computer may enable execution of computer program instructions including multiple programs or threads. The multiple programs or threads may be processed approximately simultaneously to enhance utilization of the processor and to facilitate substantially simultaneous functions. By way of implementation, any and all methods, program codes, program instructions, and the like described herein may be implemented in one or more threads which may in turn spawn other threads, which may themselves have priorities associated with them. In some embodiments, a computer may process these threads based on priority or other order.

Unless explicitly stated or otherwise clear from the context, the verbs "execute" and "process" may be used interchangeably to indicate execute, process, interpret, compile, assemble, link, load, or a combination of the foregoing. Therefore, embodiments that execute or process computer program instructions, computer-executable code, or the like may act upon the instructions or code in any and all of the ways described. Further, the method steps shown are intended to include any suitable method of causing one or more parties or entities to perform the steps. The parties performing a step, or portion of a step, need not be located within a particular geographic location or country boundary. For instance, if an entity located within the United States causes a method step, or portion thereof, to be performed outside of the United States then the method is considered to be performed in the United States by virtue of the causal entity.

While the invention has been disclosed in connection with preferred embodiments shown and described in detail, various modifications and improvements thereon will become apparent to those skilled in the art. Accordingly, the forgoing examples should not limit the spirit and scope of the present invention; rather it should be understood in the broadest sense allowable by law.

What is claimed is:

1. A processor-implemented method for power manipulation comprising:
    coupling a power source across a plurality of data racks to a power load within a data center;
    coupling a power cache to the power load;
    providing power for the power load from the power source;
    enabling the power cache to provide power to the power load when power requirements of the power load exceed limits of the power source wherein the limits are defined by a set of power policies for the data center, wherein the power policies are propagated from a data center controller to group controllers for the plurality of data racks, the group controllers report operating information to the data center controller, the power policies include a power policy for the power cache specifying a maximum duration of drain for the power cache and a maximum duration for charging the power cache, and the power policies specify both an AC voltage based on a root-mean-square average voltage and a power factor for the power load; and
    anticipating the power requirements of the power load on a dynamic basis.

2. The method of claim 1 further comprising dynamically allocating power from the power source across the plurality of data racks.

3. The method of claim 2 wherein the dynamically allocating power is based on the set of power policies.

4. The method of claim 2 wherein the dynamic power allocation allocates power across the plurality of data racks based on time-sensitive power requirements of power for each of the data racks within the plurality of data racks.

5. The method of claim 1 further comprising coupling a second power source across the plurality of data racks.

6. The method of claim 5 further comprising dynamically allocating power from the power source and the second power source across the plurality of data racks.

7. The method of claim 6 wherein the dynamically allocating power from the power source and the second power source is based on the set of power policies.

8. The method of claim 1 wherein the set of power policies includes one or more of a power limit for the power source, a power limit for the power load, a minimum state of charge for the power cache, a maximum power assistance value for the power cache, or a drain rate for the power cache.

9. The method of claim 1 wherein the set of power policies includes a group power policy.

10. The method of claim 9 wherein the group power policy includes one or more of a power limit for a group of data racks, a target power value for a group of data racks, or a group power capacity limit.

11. The method of claim 1 further comprising providing power into the power cache when the power requirements of the power load are lower than limits for the power source.

12. The method of claim 1 further comprising propagating information on the power requirements to the power source.

13. The method of claim 12 further comprising setting a power source policy for the power source.

14. The method of claim 13 further comprising controlling the power source according to the power source policy that was set.

15. The method of claim 1 further comprising setting a group policy for the power source and a second power source.

16. The method of claim 15 further comprising controlling the power source and the second power source according to the group policy that was set.

17. The method of claim 15 further comprising determining a data rack policy, for a power supply within a data rack from the plurality of data racks, based on the group policy.

18. The method of claim 15 wherein the group policy includes a hierarchical set of policies.

19. The method of claim 1 further comprising coupling a second power load to the power source.

20. The method of claim 19 wherein the power cache provides power to the power load and the second power load.

21. The method of claim 19 further comprising coupling a second power cache to the power load and the second power load.

22. The method of claim 1 wherein the data center comprises multiple data racks.

23. The method of claim 22 wherein the power cache comprises multiple batteries spread across the multiple data racks.

24. The method of claim 23 wherein the power source and a second power source share power to the multiple data racks wherein the power is shared on a fractional basis.

25. The method of claim 24 further comprising providing a plurality of power caches and coupling one of the plurality of power caches on each respective one of the multiple data racks within the data center.

26. A computer program product embodied in a non-transitory computer readable medium for power manipulation, the computer program product comprising code which causes one or more processors to perform operations of:
coupling a power source across a plurality of data racks to a power load within a data center;
coupling a power cache to the power load;
providing power for the power load from the power source;
enabling the power cache to provide power to the power load when power requirements of the power load exceed limits of the power source wherein the limits are defined by a set of power policies for the data center, wherein the power policies are propagated from a data center controller to group controllers for the plurality of data racks, the group controllers report operating information to the data center controller, the power policies include a power policy for the power cache specifying a maximum duration of drain for the power cache and a maximum duration for charging the power cache, and the power policies specify both an AC voltage based on a root-mean-square average voltage and a power factor for the power load; and
anticipating the power requirements of the power load on a dynamic basis.

27. A computer system for power manipulation comprising:
a memory which stores instructions;
one or more processors attached to the memory wherein the one or more processors, when executing the instructions which are stored, are configured to:
couple a power source across a plurality of data racks to a power load within a data center;
couple a power cache to the power load;
provide power for the power load from the power source;
enable the power cache to provide power to the power load when power requirements of the power load exceed limits of the power source wherein the limits are defined by a set of power policies for the data center, wherein the power policies are propagated from a data center controller to group controllers for the plurality of data racks, the group controllers report operating information to the data center controller, the power policies include a power policy for the power cache specifying a maximum duration of drain for the power cache and a maximum duration for charging the power cache, and the power policies specify both an AC voltage based on a root-mean-square average voltage and a power factor for the power load; and
anticipate the power requirements of the power load on a dynamic basis.

28. The method of claim 1 wherein the power policies specify periods of time during which the power cache will be enabled based on a utility power cost estimate.

29. The method of claim 1 wherein the power policies specify regular intervals of time during which the power cache will be enabled and disabled.

* * * * *